United States Patent

[11] 3,608,008

[72] Inventors Victor G. Soukup;
Donald Dunn, both of Cincinnati, Ohio
[21] Appl. No. 759,765
[22] Filed Sept. 13, 1968
[23] Continuation-in-part of Ser. No. 489,037, Sept. 21, 1965, abandoned
[45] Patented Sept. 21, 1971
[73] Assignee Cincinnati Milacron
Cincinnati, Ohio

[54] METHOD OF FORMING A SKINNED POLYURETHANE FOAM BY OVERFILLING A CLOSED PREHEATED MOLD
6 Claims, No Drawings
[52] U.S. Cl. .................................. 264/45,
260/2.5 AZ, 264/48, 264/DIG. 14
[51] Int. Cl. ........................................ B29d 27/04
[50] Field of Search .......................... 264/54, 48, 45; 260/2.5 AZ

[56] References Cited
UNITED STATES PATENTS
3,125,617   3/1964   Hoppe ......................... 264/54

3,178,490   4/1965   Petrino ......................... 264/41
3,182,104   5/1965   Cwik ............................ 264/45

OTHER REFERENCES
Knox, R. E. " Molding Rigid Urethane Foam" Dupont Hylene Urethane Foam Bulletin A-17747 Oct. 28, 1960 pp. 1–12 Copy in 264/54

Primary Examiner—Donald J. Arnold
Assistant Examiner—Paul Leipold
Attorney—Plumley, Tyner & Sandt ABSTRACT: A process for the production of rigid polyurethane articles with a hard dense skin which comprises charging a mold with liquid polyurethane foam components in a amount equal to twice but not exceeding ten times the quantity which would be required to give the same volume as the mold cavity were the foam allowed to free blow, said mold having been preheated to a temperature of from 110° to 175° F. before charging; closing the mold; curing said foam while externally heating to at least maintain the preheat of the mold; and removing the article from the mold.

METHOD OF FORMING A SKINNED POLYURETHANE FOAM BY OVERFILLING A CLOSED PREHEATED MOLD

This application is a continuation-in-part of Ser. No. 489,037 filed Sept. 21, 1965.

This invention relates to methods of preparing foamed plastic materials and more particularly to methods of producing improved molded articles of polyurethane foams.

Foamed plastic materials have found wide and increasing applicability in fields wherein their properties, such as light weight, relatively high strength to weight ratio, buoyancy, and low thermal conductivity provide distinct advantages over other materials. Foamed polyurethanes because of their low cost and good physical properties have been proposed for a multitude of end uses.

Polyurethane foams, in common with other foamed plastics, possess a cellular structure, the exterior surfaces of which tend to have a rough, irregular character which is undesirable and, more importantly, because of the relative softness of this surfaces of this cellular structure, molded foamed articles have often times been found so lacking in physical strength and resistance to abrasion as to limit their usefulness.

In efforts to overcome these disadvantages, many and various molding techniques and manipulations of the foamable plastic components have been proposed in the past, the main objective being to obtain a smooth skin or surface on the exterior of the molded articles so as to improve their abrasion resistance and to add to their structural strength. Among these methods are included techniques for adhering metallic and nonmetallic skins to the foams. In addition, it has been proposed to subject the molded article to heat and compacting pressure to effect a melting and hence smoothing of the surface. Such a procedure has among its disadvantages the fact that it presents an added step which increases the cost of preparing the final article.

Again, proposals have been made to insulate the mold walls to prevent radiation of heat during the molding step thus allegedly allowing entrapment of the gas evolved from the foaming material in the peripheral cells and sealing of each cell from the other, thus forming a smooth skin over the exposed surfaces. It has also been proposed to subject the foaming material in selected surface areas to mold temperatures below the effective vaporization temperature of the blowing agent so as to avoid foaming and to effect a polymerization of the foam reactants in those selected places and thus obtain a smooth skin or surface in such areas.

These and many other similar proposals of the prior art have the common disadvantage, among others, of adding procedural steps and complex equipment which, in turn, add to the time, effort, and cost of the overall molding operation and resultant product.

It is an object of the present invention to overcome the disadvantage of the prior art and to provide a method for the production of new and improved molded articles from polyurethane foam-forming materials.

Other objects and advantages will be apparent from the following description.

It has been found, according to this invention, that if mixed liquid polyurethane foam components are charged into a previously heated, fixed volume, closable mold in an amount at least twice that which would be required to give the same volume as that of the mold cavity were the foam components allowed to free blow, and if, thereafter, the charged components are allowed to foam and are thereafter cured, a molded polyurethane foam article is obtained which completely fills the mold and has an overall density at least 100 percent greater than the free blow density of the same foam formulation and has greatly improved characteristics such as high structural strength and a dense, hard, smooth skin or layer on the exterior surfaces of the molded article.

The process of this invention yields a polyurethane foam molding comprising a cellular core totally enclosed by a self generated, dense, relatively hard, durable skin layer of essentially the same chemical composition as the core and having a $D_c/D_o$ ratio of from 0.30 to 0.90 and a $D_s/D_o$ ratio of from 1.2 to 3.0 where $D_c$ is the density of the core, $D_s$ is the density of the skin, and $D_o$ is the overall density of the foam molding. (In "nonmineral-filled" polyurethanes, $D_s$ does not exceed about 70 lbs. per cubic foot and the ratios $D_c/D_o$ and $D_s/D_o$ must not be used in such manner as to obtain values of $D_s$ greater than 70 lbs. per cubic foot.) Typically polyurethane foam moldings obtained by the process of this invention have been found to have structural utility from the standpoint of factors such as high strength to weight ratios, high stiffness, high impact strength, high surface hardness, and durable outer surfaces and to exhibit overall densities in the range of 15.0 to 40.0 lbs. per cubic foot and preferably in the range of 18.0 to 30.0 lbs. per cubic foot.

It has been found that the ratio between the amount of mixed foam components added to the mold and the amount of mixed foam components which would free blow to the same volume as that of the mold cavity is a critical and controlling factor and must be carefully observed in order to fill the mold completely and obtain the improved products of this invention.

From a practical standpoint, this invention makes it possible for the first time to determine in advance the amount of charge of polyurethane foam component of known free-blow density which need be placed in a mold of known volume to give an article of any desired overall density from 100 percent of the ultimate free-blow density upwards, and which article has a hard, dense, smooth skin on its exterior surfaces. Thus, for example, in case of a mold having a volume of 1 cubic foot, if one employs a polyurethane foam having a free-blow density of 5 pounds per cubic foot and desires a molding of 20 pounds per cubic foot overall density, one would place 20 pounds of foam components in the mold to achieve a packing factor of 4, said packing factor being the controlling feature in obtaining the resultant improved products of this invention.

Shelves, drawers, and similar articles having commercial value and utility have been made by the process of this invention and the hard, dense skin and relatively high overall density of such products fit them for a multitude of similar end-uses.

It has also been found that highly uniform and desirable results are obtained, in the practice of this invention, if one end of the longest dimension of the mold is elevated at least slightly from the horizontal. It is believed that this permits more rapid and complete expansion of the foam to all areas within the mold cavity.

The practice of this invention is adaptable to the use of polyurethane foam systems generally. Thus, there may be employed in the practice of the invention polyurethane foams which may be prepared by numerous methods and materials. Such methods and materials include: those wherein all of the components such as the polyisocyanate, polyol, catalyst, blowing agent, and surfactant are mixed together immediately prior to being added to a mold; those wherein the polyisocyanate component is prereacted with a portion of the polyol component to form an isocyanate terminated prepolymer of either relatively low or relatively high molecular weight and said isocyanate terminated prepolymer mixed with the remainder of the polyol component in the presence of catalyst, blowing agent, and surfactant immediately prior to being added to a mold. The formation of polyurethane foam may be accomplished by blowing mechanisms involving: (a) the thermal decomposition of one or more components to form gaseous products: (b) the reaction between one or more components of the polyurethane foam system to form gaseous products; and (c) the volatilization of one or more components of the polyurethane foam system.

The various reactive and nonreactive substances present in a polyurethane foam formulation constitute the components of said polyurethane foam system. Numerous compounds, which can be present as one or more components of a polyurethane foam system, and which can thermally decompose to yield a gaseous product or products, thereby causing expansion of the foam, are cited in the polyurethane foam literature and patents. Several compounds of this type which will decompose with liberation of a gas and which have been shown to be useful for foam formation are N,N-dinitrosopentamethylene tetramine, azobisisobutyronitrile, N,N'dimethyl-N,N'-dinitrosotetephthalamide, diazodiaminobenzene, oxybisbenzene sulfonyl hydrazide, and the oxalate of dicyandiamide. Volatilization of an inert low boiling component of the polyurethane foam formulation constitutes another method for achieving foam formation. Suitable compounds capable of volatilization to produce a foam structure which have been previously used include trichlorofluoromethane, dichlorodifluoromethane, pentane, isopentane, chloroform, and methylene chloride. The choice of the low boiling inert liquid for foaming is often dictated by factors such as flammability and toxicity. As a result of these considerations, low boiling halogenated hydrocarbons are generally preferred for producing polyurethane foam via this method, viz, the volatilization of an inert, low boiling component. Reactions between isocyanates and water, isocyanates and carboxylic acids, isocyanates and inorganic acids, such as hydrochloric acid, and isocyanates and alkali metal carbonates, such as sodium carbonate, can be used to generate carbon dioxide which in turn will cause expansion of the polyurethane system to produce a foam structure.

While polyols (organic polyhydroxyl compounds) are generally used in the preparation of polyurethane foam, other organic molecules containing two or more Zerewitinoff-active hydrogen atoms, may be employed. Polyisocyante compounds (organic molecules having two or more isocyanate groups) employed in the preparation of polyurethane foam may be aliphatic, aromatic, heterocyclic, or aryl-alkyl in nature. A multitude of such known components and methods for the production of polyurethane foam components and the mixing thereof are given in the literature such as in U.S. Pat. No. 3,127,457, 3,154,606, and Reissue 24,514.

The fixed volume, closable mold into which the charge of foam components is placed is desirably heated, prior to the charge, to a temperature (of at least about in the range of 110° to 175° F.), preferably about 120° F. After closing the mold, foaming is allowed to take place for an interval of 1 to 4 minutes, during which the mold is at a temperature about or slightly greater than that of the foam components added to the mold. Following completion of this foaming reaction, i.e., expansion to form a cellular product in the closed mold, which normally takes place in 1 to 4 minutes, the foamed material in the closed mold is cured, e.g., by maintenance of the heat of or addition of heat to the mold, this heating interval being dependent upon the type of heat applied. Thus, induction or high frequency heating may be accomplished in seconds while more conventional infrared, hot air, or like heating may require from 10—30 minutes. The resulting product is found to have a smooth, hard, abrasion-resistant skin of relatively high density on its outer surfaces, totally enclosing and integral with an inner, more cellular structure, the overall density of the product being at least 100 percent greater than the free-blow density. It is thus possible, according to this invention, to prepare articles of such strength, uniformity, and exteriorly smooth surfaces that they are adapted for a multitude of end-uses.

The following examples will serve to illustrate in greater detail how this invention may be practiced.

EXAMPLE I 100 grams of a polyol mixture at about 106° F. comprising 97.0 grams of a phosphoric/phosphorous acid ester polyhydroxyl compound of hydroxyl number of about 460 ("Pelron" 9744 made by Pelron Corp.), 1.0 grams of a silicone surfactant, and 2.0 grams of dimethylethanol amine are mixed thoroughly with 138 grams of an isocyanate prepolymer mixture at about 70° F. comprising 131.5 grams of an isocyanate terminated prepolymer having a free isocyanate content of about 25 percent and 6.5 grams of monofluorotrichloromethane.

45.8 grams of the warm resulting liquid mixture while still liquid are charged into a 12 cubic inch rigid aluminum mold (2 ×1 ×6 inches) previously heated to about 120° F. The mold is closed and clamped shut. About 2 minutes after closing and clamping the mold is placed in a circulating air oven at 120° F. for 20 minutes. Upon removing the mold from the oven the mold is unclamped and the molded part is removed. The completely filled out molding obtained has an overall density of 14.6 lbs./ft.$^3$. 45.8 grams of the above resulting liquid mixture when allowed to free blow in an open paper cup forms a foam volume of 28.7 cubic inches and the resulting foam exhibits a density of 6.1 lbs./ft.$^3$. 19.9 grams of the above resulting warm liquid mixture under the same molding conditions when charged into the 12 cubic inch mold failed to yield a completely filled out molding. Had the molding been completely filled out, it would have had an overall density of 6.3 lbs./ft.$^3$. 29.0 grams of the above resulting warm liquid mixture under the same molding conditions when charged into the 12 cubic inch mold failed to yield a completely filled out molding. Had complete fill out occurred, the resulting molding would have had an overall density of 9.2 lbs./ft.$^3$. 35.4 grams of the above resulting warm liquid mixture under the same molding conditions when charged into the 12 cubic inch mold failed to yield a completely filled out molding. Had complete fill out occurred, the molding would have had an overall density of 11.2 lbs./ft.$^3$.

Increasing the charge of the above resulting warm liquid mixture to the 12 cubic inch mold to 63.9 grams and 98.1 grams produced completely filled out moldings, under the same molding conditions, whose surface properties (surface hardness, mar resistance, etc.) increased with increasing charge of the liquid mixture. The variation of the charge of the above resulting warm liquid mixture to the 12 cubic inch mold and effect of this variation on molding results and quality of the molding may be seen in the following chart.

| Charge to the mold (gms) | Percent fill out | Overall density for complete fill out (lbs./ft.$^3$) | Molding quality |
|---|---|---|---|
| 19.9 | 50 | 6.3 | Soft surface. |
| 29.0 | 80 | 9.2 | Do. |
| 35.4 | 98 | 11.2 | Do. |
| 45.8 | 100 | 14.6 | Moderately hard surface. |
| 63.9 | 100 | 20.3 | Hard surface. |
| 98.1 | 100 | 31.3 | Very hard surface. |

EXAMPLE II

Following the molding procedure and molding conditions in Example I, 100 grams of a polyol mixture, "Selectro foam" 6500A42-151, made by the Pittsburgh Plate Glass Co.), at about 70° F. comprising 91.39 grams of an organic polyhydroxyl compound hydroxyl number of about 456, 0.53 grams of water, 1.13 grams of a silicone surfactant, 0.39 grams of dimethyl ethanol amine, 0.15 grams of DABCO, and 6.41 grams of monofluorotrichloromethane are mixed thoroughly with 118.3 grams of Mondur MR (crude diphenyl methane - 4,4'-diisocyanate) at about 121° F.

18.0 grams of the above resulting warm liquid mixture when place in the 12 cubic inch mold under the same molding conditions failed to yield a completely filled out molding. Had the molding been completely filled out it would have had an overall density of 5.7 lbs./ft.$^3$. 22.3 grams of the above resulting warm liquid mixture when charged to the 12 cubic inch mold under the same molding conditions failed to yield a completely filled out molding. Had complete fill out occurred, the molding would have had an overall density of 7.1 lbs./ft.$^3$. 46.7 grams, 60.7 grams, and 89.5 grams of the above resulting warm liquid mixture when placed in the 12 cubic inch mold under the same molding conditions as in the previously stated moldings yielded completely filled out molded parts whose surface characteristics (hardness, mar resistance, etc.) increased with the increasing amount of the liquid mixture placed in the mold.

EXAMPLE III

Following the molding procedure and molding conditions in Example I, 100 grams of a polyol mixture at about 106° F. comprising 97.0 grams of a phosphoric/phosphorous acid ester polyhydroxyl compound of hydroxyl number of about 460, as described in Example I, 1.0 grams of a silicone surfactant, and 2.0 grams of dimethyl ethanol amine are mixed thoroughly with 163.1 grams of an isocyanate prepolymer mixture at about 70° F. comprising 145.6 grams of an isocyanate terminated prepolymer having a free isocyanate content of about 25 percent and 17.5 grams of monofluorotrichloromethane.

25.4 grams of the above resulting warm liquid mixture when charged to the 12 cubic inch aluminum mold previously heated to about 120° F. yielded a completely filled out molding having an overall density of 8.1 lbs./ft.$^3$. 25.4 grams of the above resulting warm liquid mixture when allowed to free blow in an open paper cup yields a foam volume of 24.4 cubic inches and the resulting foam exhibits a density of 4.0 lbs./ft.$^3$. 19.8 grams of the above resulting warm liquid mixture when placed in the 12 cubic inch mold under the same molding conditions failed to yield a completely filled out molding. Had the molding been completely filled out, it would have had a density of 6.3 lbs./ft.$^3$. 14.2 grams of the above resulting warm liquid mixture, when charged to the 12 cubic inch mold under the same molding conditions, failed to yield a completely filled out molding. Had complete fill out occurred, the molding would have had an overall density of 4.5 lbs./ft. $^3$. 37.8 grams, 51.0 grams, 63.3 grams, and 94.2 grams of the above resulting warm liquid mixture when charged to the 12 cubic inch mold yielded completely filled out molding whose surface properties (hardness, mar resistance, etc. increased with increasing charge to the mold.

EXAMPLE IV

Following the molding procedure and molding conditions in Example I, 100 grams of a polyol mixture of about 160° F. comprising 98.0 grams of a phosphoric/phosphorus acid ester polyhydroxyl compound of hydroxyl number of about 460, as described in Example I, 1.0 grams of a silicone surfactant and 1.0 grams of dimethyl ethanolamine are thoroughly mixed with 182.5 grams of an isocyanate prepolymer mixture at about 70° F., comprising 146.0 grams of an isocyanate terminated prepolymer having a free isocyanate prepolymer mixture at about b 70° F., comprising 146.0 grams of an isocyanate terminated prepolymer having a free isocyanate content of about 25 percent and 36.5 grams of monofluorotrichloromethane. 15.1 grams of the resulting warm liquid mixture while still liquid when charged into the 12 cubic inch aluminum mold previously heated by about 120° F. yielded a completely filled out molding having an overall density of 4.8 lbs./ft.$^3$. 15.1 grams of the resulting warm liquid mixture when allowed to free blow in an open paper cup yielded a foam volume of 25 cubic inches and the resulting foam exhibits a density of 2.3 lbs./ft.$^3$. 10.9 grams of the resulting warm liquid mixture when placed in the 12 cubic inch mold under the same molding conditions failed to yield a completely filled out molding. Had the molding been completely filled out it would have had an overall density of 3.5 lbs./ft.$^3$. 8.9 grams of the resulting warm liquid mixture when charged into the 12 cubic inch aluminum mold under the same molding conditions failed to yield a completely filled out molding. Had complete fill out occurred, the molding would have had an overall density of 2.8 lbs./ft.$^3$. 30.4 grams and 62.1 grams of the resulting warm liquid mixture when charged to the 12 cubic inch aluminum mold under the same molding conditions yielded completely filled out moldings whose surface characteristics (hardness, mar resistance, etc.) increased with the increasing amount of the liquid mixture placed in the mold.

What is claimed is:

1. The process for the preparation of rigid molded polyurethane foam articles having a hard, dense, self-generated skin totally enclosing a cellular core of lower density composed of essentially the same chemical composition which comprises
   1. charging a fixed volume, closable mold with mixed liquid polyurethane foam components in an amount equal to twice but not exceeding ten times the quantity which would be required to give the same volume as the mold cavity were said foam components allowed to free blow, said mold having been preheated to a temperature of from 110° to 175° F before charging;
   2. completely closing said mold;
   3. allowing said foam component to foam to the complete volume of the mold cavity while retaining said foam within said cavity;
   4. curing said foam within said cavity by externally adding heat to the extent to at least maintain the preheat of the mold; and
   5. removing the resultant cured article from the mold.

2. The process of claim 1 in which the polyurethane foam is obtained by the reaction of an organic polyisocyanate with an organic compound containing at least two Zerewitinoff-active hydrogen atoms.

3. The process of claim 1 in which the polyurethane foam is formed by the gaseous product resulting from the reaction of two components of the liquid polyurethane foam component mixture.

4. The process of claim 1 in which the resultant polyurethane foam article is formed by the volatilization of an inert liquid blowing agent said inert liquid blowing agent being non-reactive with isocyanate.

5. The process of claim 1 wherein the resultant rigid molded polyurethane foam article has a $D_c/D_o$ ratio of from 0.300/1.00 to 0.90/1.00 and a $D_s/D_o$ ratio of from 1.2/1.0 to 3.0/1.0 where $D_c$ is the density of the core expressed in pounds per cubic foot or equivalent units, $D_s$ is the density of the skin expressed in pounds per cubic foot or equivalent units and $D_o$ is the overall density of the foam molding expressed in pounds per cubic foot or equivalent units and where $D_s$ shall not exceed 60 pounds per cubic foot for a nonmineral filled polyurethane and $D_o$ shall be from 15 pounds per cubic foot to 40 pounds per cubic foot provided the ratio of $D_s$ to $D_o$ in the defined range shall not be taken in a manner such as to obtain a calculated value of $D_s$ greater than the prescribed limit of 60 pounds per cubic foot for values of $D_o$ within the given range of 15 to 40 pounds per cubic foot.

6. The process of claim 5 wherein $D_o$ is from 18 to 30 pounds per cubic foot.